(12) United States Patent
Shreevani et al.

(10) Patent No.: US 9,350,187 B2
(45) Date of Patent: May 24, 2016

(54) PRE-CHARGING VEHICLE BUS USING PARALLEL BATTERY PACKS

(71) Applicant: Johnson Controls Technology LLC, Wilmington, DE (US)

(72) Inventors: Kogatam Shreevani, Farmington Hills, MI (US); Nicholas H. Norppa, Grafton, WI (US); Matthew D. Elberson, Menomonee Falls, WI (US)

(73) Assignee: Johnson Controls Technology LLC, Wilmington, DE (US)

( * ) Notice: Subject to any disclaimer, the term of this patent is extended or adjusted under 35 U.S.C. 154(b) by 685 days.

(21) Appl. No.: 13/712,689

(22) Filed: Dec. 12, 2012

(65) Prior Publication Data

US 2013/0175857 A1 Jul. 11, 2013

Related U.S. Application Data

(60) Provisional application No. 61/584,592, filed on Jan. 9, 2012.

(51) Int. Cl.
| | | |
|---|---|---|
| *H02H 7/18* | (2006.01) | |
| *H02J 7/00* | (2006.01) | |
| *B60L 11/18* | (2006.01) | |
| *H02J 7/34* | (2006.01) | |
| *B60L 3/00* | (2006.01) | |
| *B60L 3/04* | (2006.01) | |
| *B60L 11/12* | (2006.01) | |
| *B60L 11/14* | (2006.01) | |

(52) U.S. Cl.
CPC ............... *H02J 7/007* (2013.01); *B60L 3/0023* (2013.01); *B60L 3/0046* (2013.01); *B60L 3/0069* (2013.01); *B60L 3/0084* (2013.01); *B60L 3/04* (2013.01); *B60L 11/123* (2013.01); *B60L 11/14* (2013.01); *B60L 11/1855* (2013.01); *B60L 11/1861* (2013.01); *B60L 11/1877* (2013.01); *H02J 7/345* (2013.01); *B60L 2200/12* (2013.01); *B60L 2200/18* (2013.01); *B60L 2200/32* (2013.01); *B60L 2200/36* (2013.01); *B60L 2200/40* (2013.01); *B60L 2240/12* (2013.01);

(Continued)

(58) Field of Classification Search
USPC ........................................................ 307/10.7
See application file for complete search history.

(56) References Cited

U.S. PATENT DOCUMENTS

| 6,597,072 B2 | 7/2003 | Yamazaki |
|---|---|---|
| 7,109,686 B2 | 9/2006 | Schulte |

(Continued)

FOREIGN PATENT DOCUMENTS

EP 1335484 A2 8/2003

OTHER PUBLICATIONS

International Search Report and Written Opinion for PCT No. PCT/US2012/070132 dated Oct. 1, 2013; 10 pgs.

(Continued)

*Primary Examiner* — Ronald W Leja
(74) *Attorney, Agent, or Firm* — Fletcher Yoder, P.C.

(57) ABSTRACT

Systems and methods for pre-charging a bus capacitance in vehicles that receive at least a portion of their motive power from electricity generated from a battery are provided. By way of example, an embodiment includes a vehicle control unit (VCU) that receives battery pack data from a battery management unit (BMU) of each of a plurality of battery packs and determines, based on the battery pack data, which battery packs may be used to pre-charge the bus capacitance in parallel. The VCU issues commands to each of the BMUs to connect pre-charge circuits between each of the plurality of battery packs and the bus capacitance and receives status information from each of the BMUs to determine whether or not the bus capacitance was successfully pre-charged by the battery packs.

20 Claims, 12 Drawing Sheets

(52) U.S. Cl.
CPC .......... *B60L2240/34* (2013.01); *B60L 2240/36* (2013.01); *B60L 2240/421* (2013.01); *B60L 2240/545* (2013.01); *B60L 2240/547* (2013.01); *B60L 2240/549* (2013.01); *B60L 2240/662* (2013.01); *B60L 2250/16* (2013.01); *Y02T 10/6217* (2013.01); *Y02T 10/642* (2013.01); *Y02T 10/7005* (2013.01); *Y02T 10/705* (2013.01); *Y02T 10/7022* (2013.01); *Y02T 10/7044* (2013.01); *Y02T 10/7077* (2013.01); *Y02T 10/7291* (2013.01); *Y02T 90/16* (2013.01)

(56) References Cited

U.S. PATENT DOCUMENTS

| | | | |
|---|---|---|---|
| 8,049,372 | B2 | 11/2011 | Newhouse |
| 2002/0109407 | A1 | 8/2002 | Morimoto et al. |
| 2004/0061503 | A1* | 4/2004 | Morimoto ................ B60K 6/28 324/418 |
| 2007/0080662 | A1* | 4/2007 | Wu ........................ B60L 3/0046 320/110 |
| 2010/0277845 | A1 | 11/2010 | Park et al. |
| 2011/0049977 | A1* | 3/2011 | Onnerud ............... B60L 3/0046 307/9.1 |
| 2011/0234177 | A1 | 9/2011 | Kohara et al. |
| 2012/0080938 | A1 | 4/2012 | Rutkawski |
| 2012/0105001 | A1* | 5/2012 | Gallegos ............... B60L 3/0046 320/109 |
| 2012/0251866 | A1* | 10/2012 | Matejek ................ B60L 3/0046 429/123 |
| 2013/0175857 | A1* | 7/2013 | Shreevani ............. B60L 3/0023 307/9.1 |

OTHER PUBLICATIONS

CN 201280071197.7 First Office Action dated Feb. 16, 2016.

* cited by examiner

PRE-CHARGING VEHICLE BUS USING PARALLEL BATTERY PACKS

CROSS REFERENCE TO RELATED APPLICATIONS

This application claims priority from and the benefit of U.S. Provisional Application Ser. No. 61/584,592, entitled, "Pre-charging Vehicle Bus Using Parallel Battery Packs," filed Jan. 9, 2012, which is hereby incorporated by reference for all purposes.

BACKGROUND

The present disclosure relates generally to the battery systems for vehicles deriving at least a portion of their motive power from an electrical power source. More specifically, the present disclosure relates to systems and methods used to pre-charge a bus capacitance in vehicles using parallel battery packs.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Vehicles, such as cars, trucks, and vans, are widely used to facilitate the movement of people and goods in modern society. Vehicles may utilize a number of different energy sources (e.g., a hydrocarbon fuel, a battery system, a capacitance system, a compressed air system) to produce motive power. For example, certain vehicles may include a battery system and use electric power for part or all of their motive power.

In general, such vehicles may provide a number of advantages as compared to traditional, gas-powered vehicles that solely rely on internal combustion engines for motive power. For example, such vehicles may produce fewer undesirable emission products and may exhibit greater fuel efficiency as compared to vehicles using only internal combustion engines to propel the vehicle.

To conserve stored energy, the battery systems used to provide motive power for vehicles may be disconnected from the vehicle's power systems when the vehicle is not in operation. Because of the large voltage difference and the bus capacitance between the battery systems and the disconnected power systems, immediately reconnecting a battery system to a disconnected power system on the vehicle may cause a large inrush of current into the bus capacitance, potentially damaging both the battery and the power system. Hence, pre-charging systems have been developed that are designed to limit the inrush current of a battery system until the bus capacitance is sufficiently charged. These pre-charging systems often include a pre-charge resistor that may be connected in series between the battery system and the bus capacitance until the bus capacitance is charged. The capacitance of the bus capacitance and the resistance of the pre-charge resistor effectively form an RC circuit, causing a delay in the pre-charge system in relation to the RC time constant of the RC circuit.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments include systems and methods for pre-charging the bus capacitance in a vehicle that uses parallel battery packs communicating over a vehicle bus. In an embodiment, a vehicle control system includes a vehicle control unit configured to send commands to a battery management unit on each of the parallel battery packs to begin a pre-charge sequence. The battery management unit of each of the parallel battery packs closes contactors on the battery pack to couple a pre-charge circuit to the parallel battery packs. During the pre-charge sequence, the battery management unit of each of the parallel battery packs sends status information to the vehicle control unit, and the vehicle control unit determines commands to send to ensure the bus capacitance is successfully pre-charged. In another embodiment, a method includes receiving battery pack data from the battery management unit of each of the parallel battery packs, using the battery pack data to determine which battery packs may pre-charge the bus capacitance in parallel, and sending commands to the battery management unit of each of the parallel battery packs. Once the battery management unit of each of the parallel battery packs receives the command to begin pre-charging, the battery management unit will close a pre-charge contactor in each battery pack to electrically couple the battery pack to a pre-charge circuit. The method includes receiving status information from the battery management unit of each of the parallel battery packs, and determining if the bus capacitance was successfully pre-charged based on the status information.

DRAWINGS

Various aspects of this disclosure may be better understood upon reading the following detailed description and upon reference to the drawings in which.

Figure 6A:
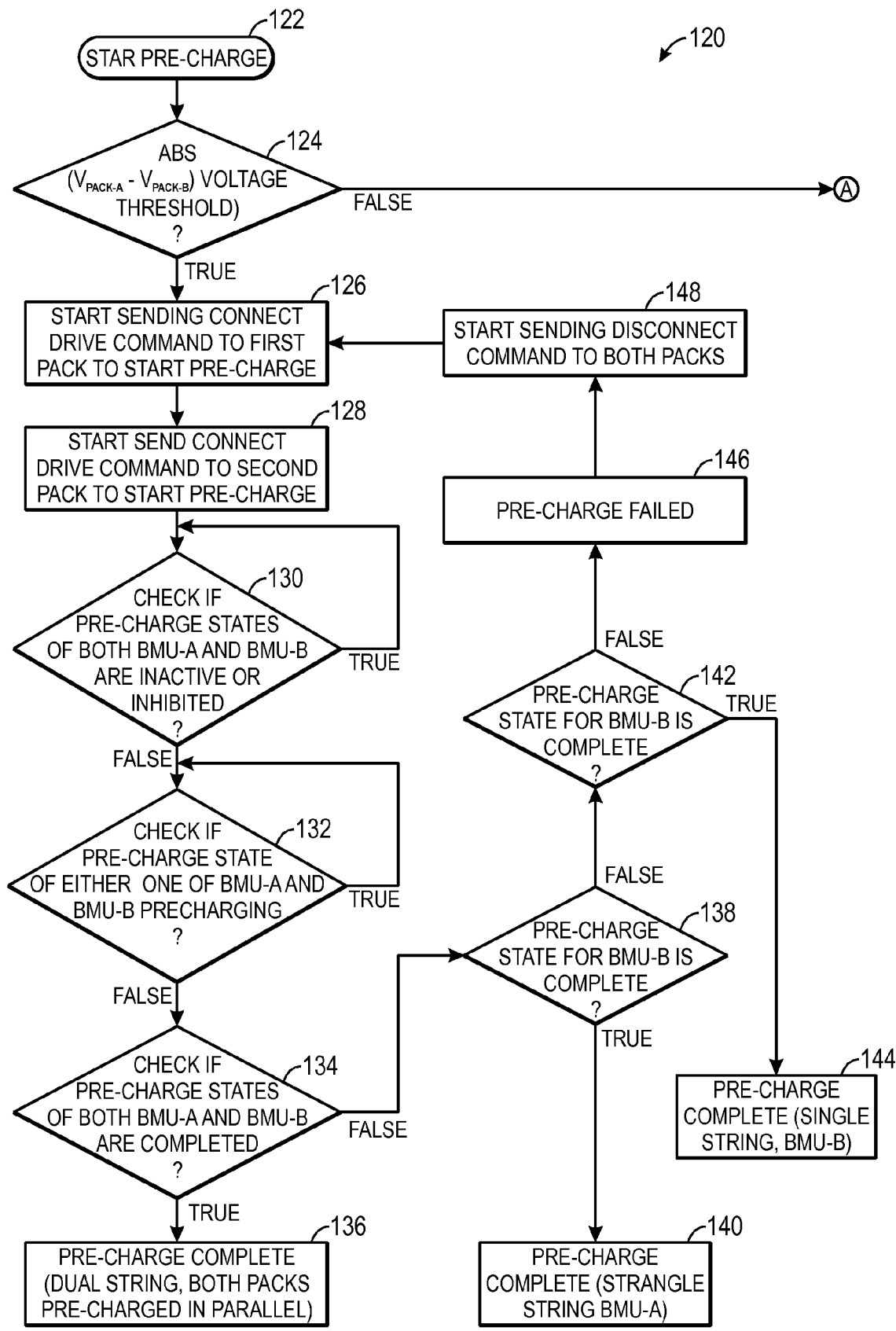
Figure 6B:
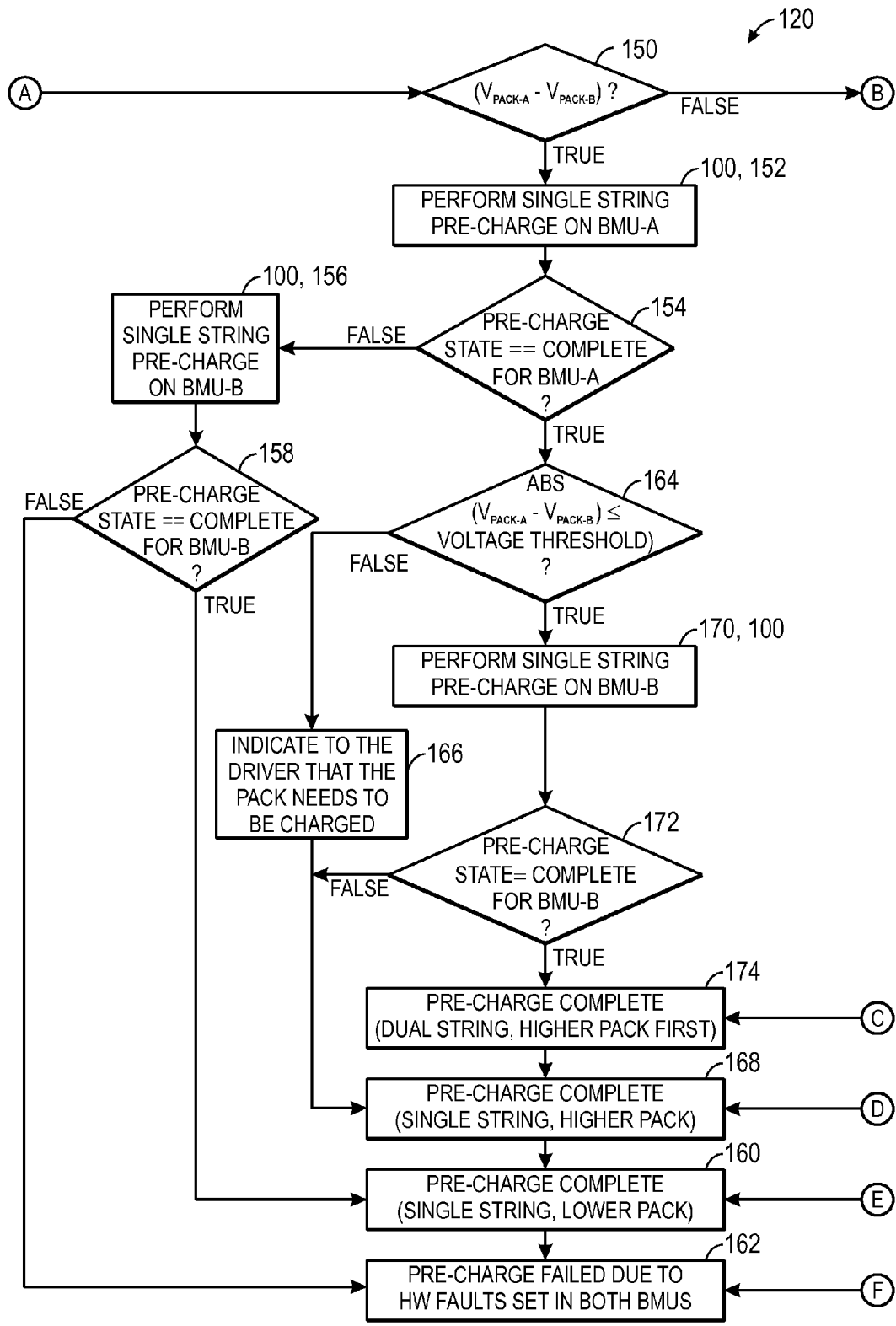
Figure 6C:
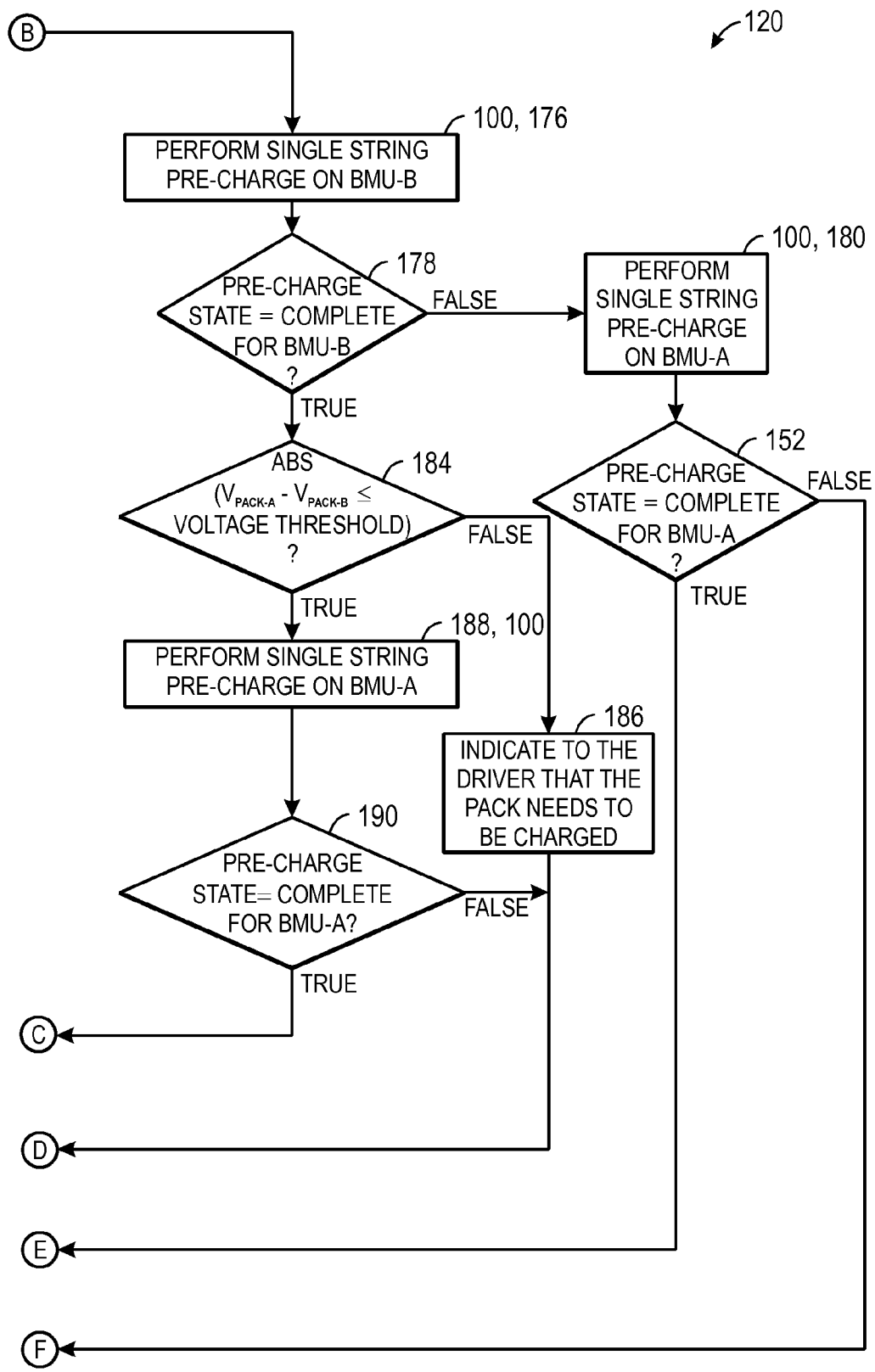
Figure 7A:
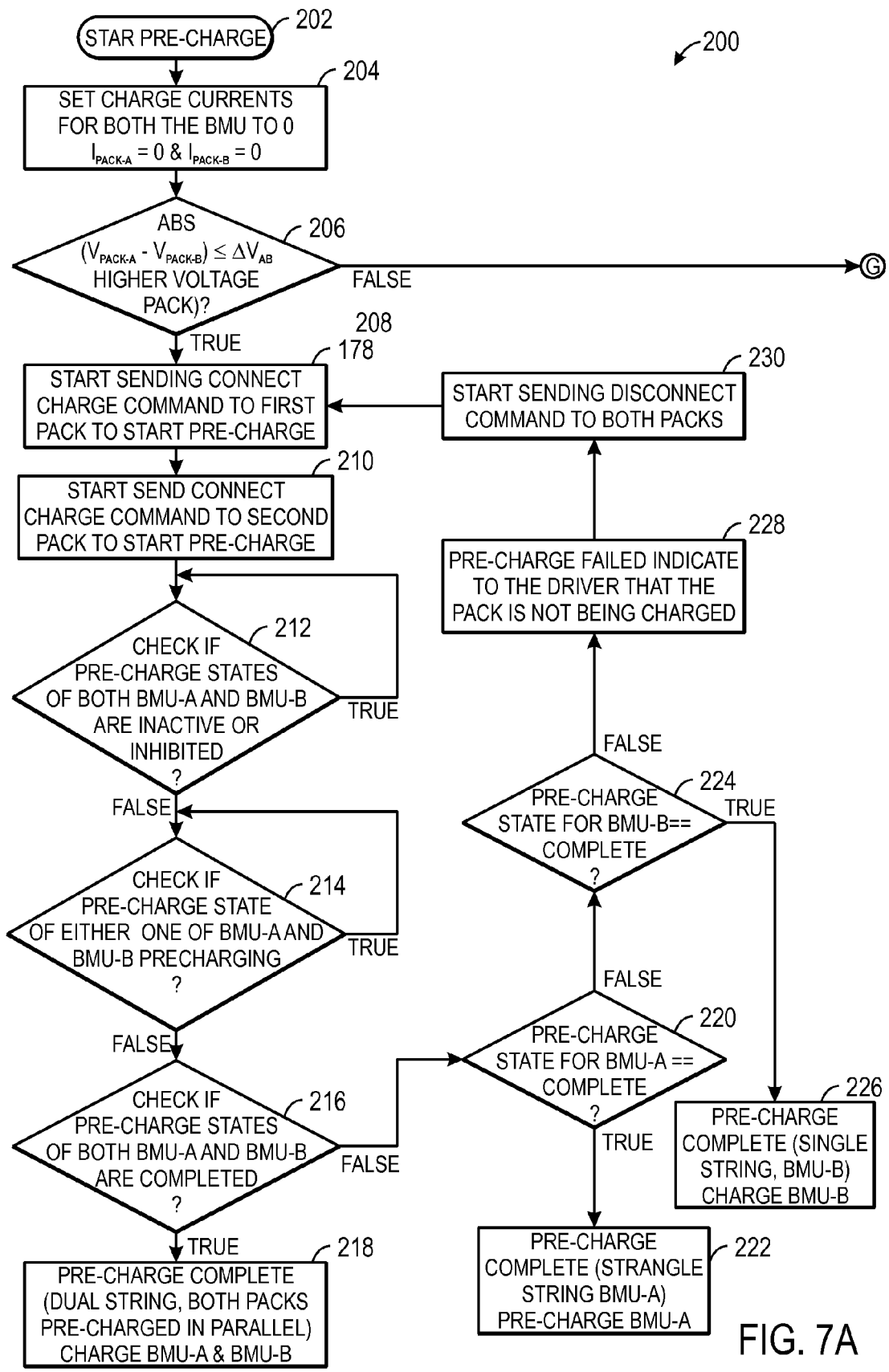
Figure 7B:
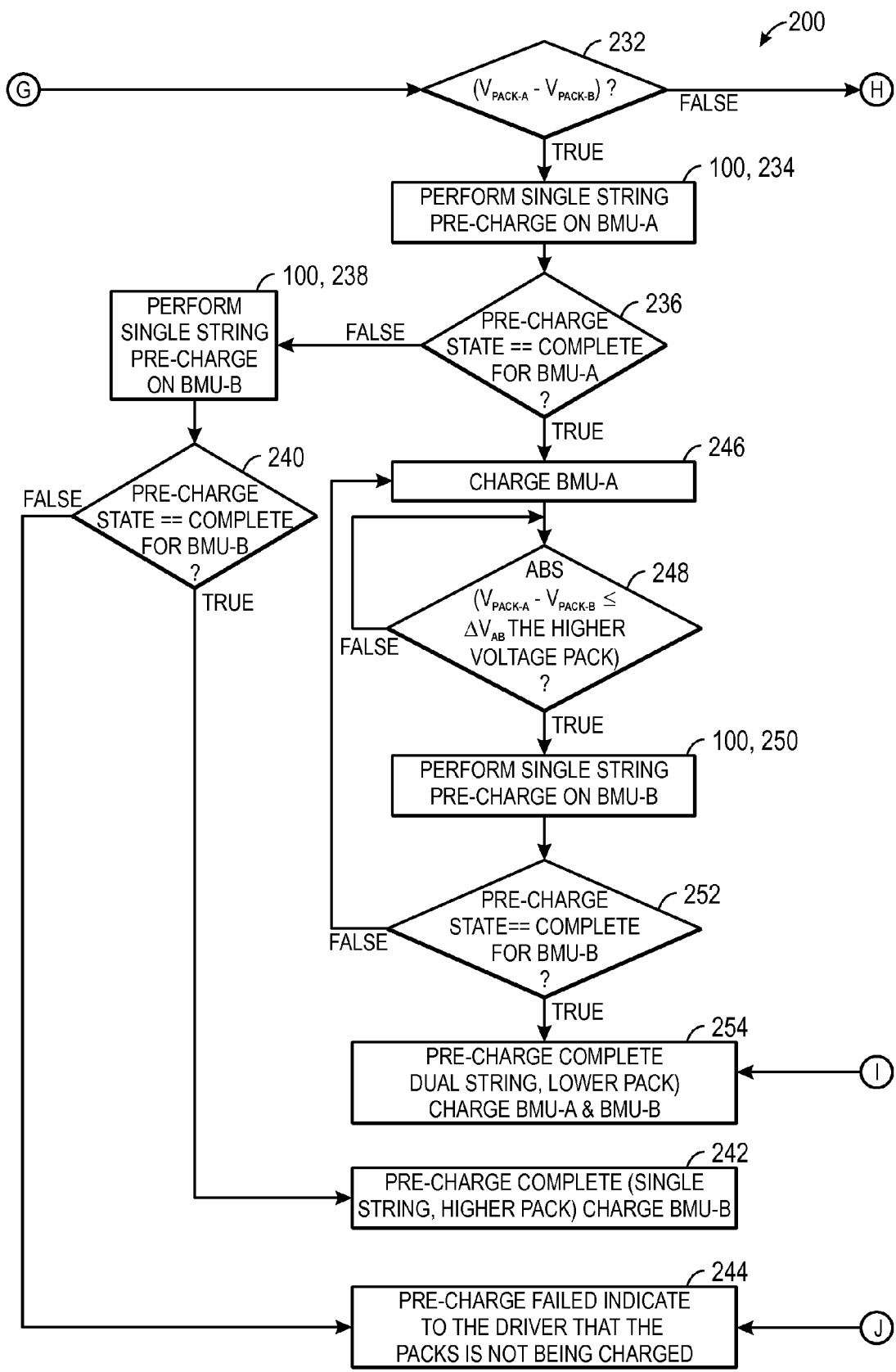
Figure 7C:
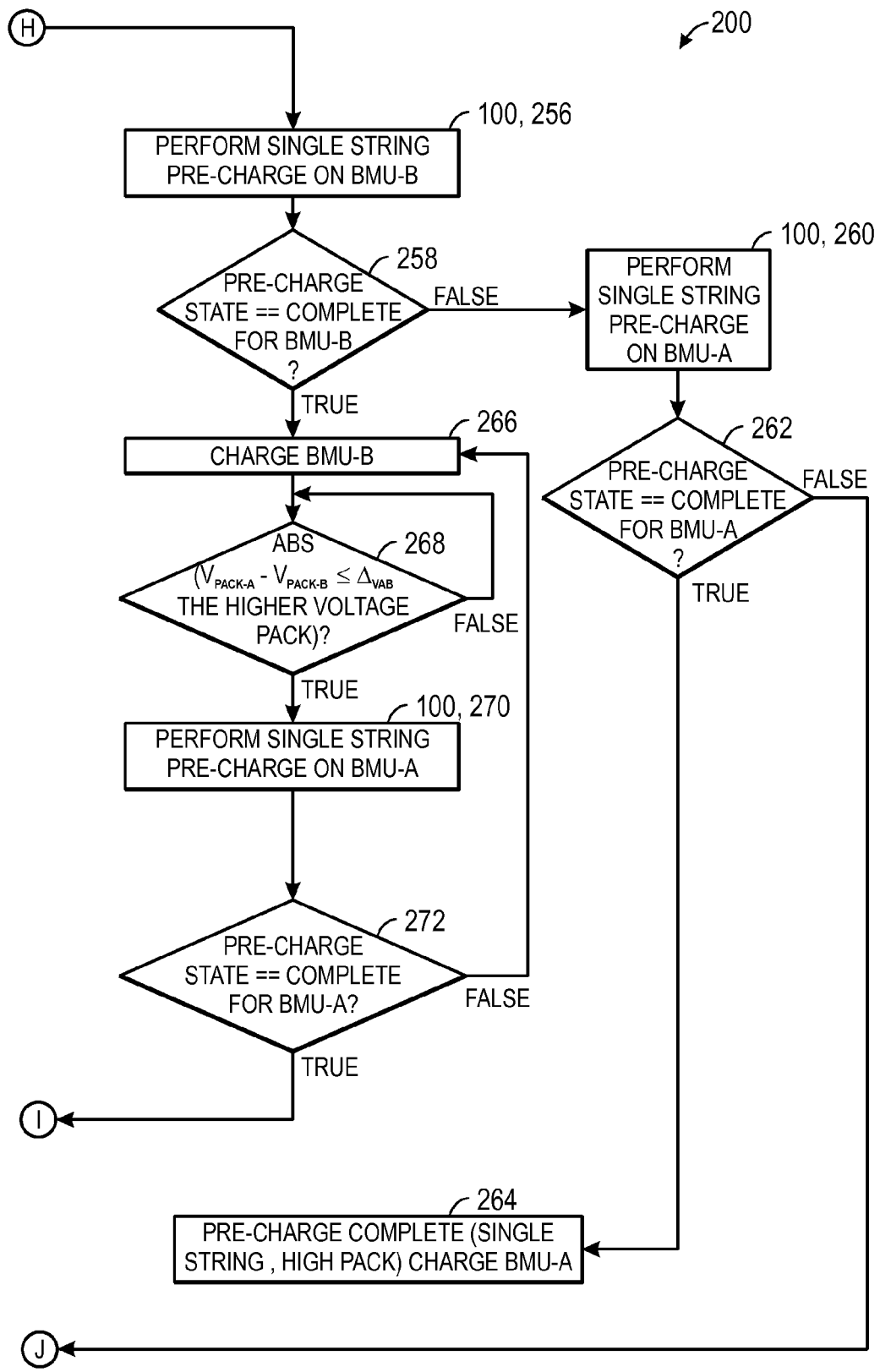
Figure 8A:
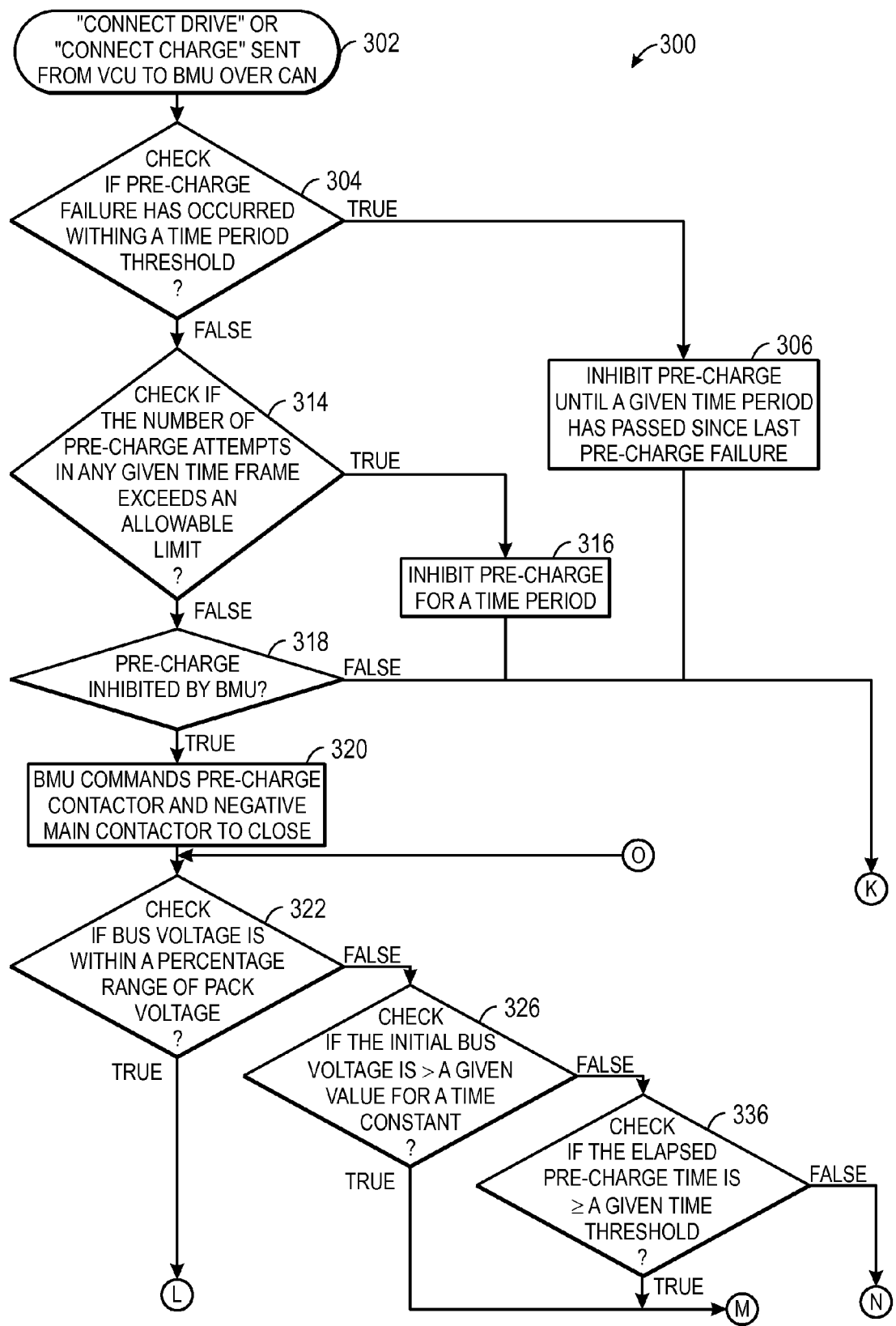
Figure 8B:
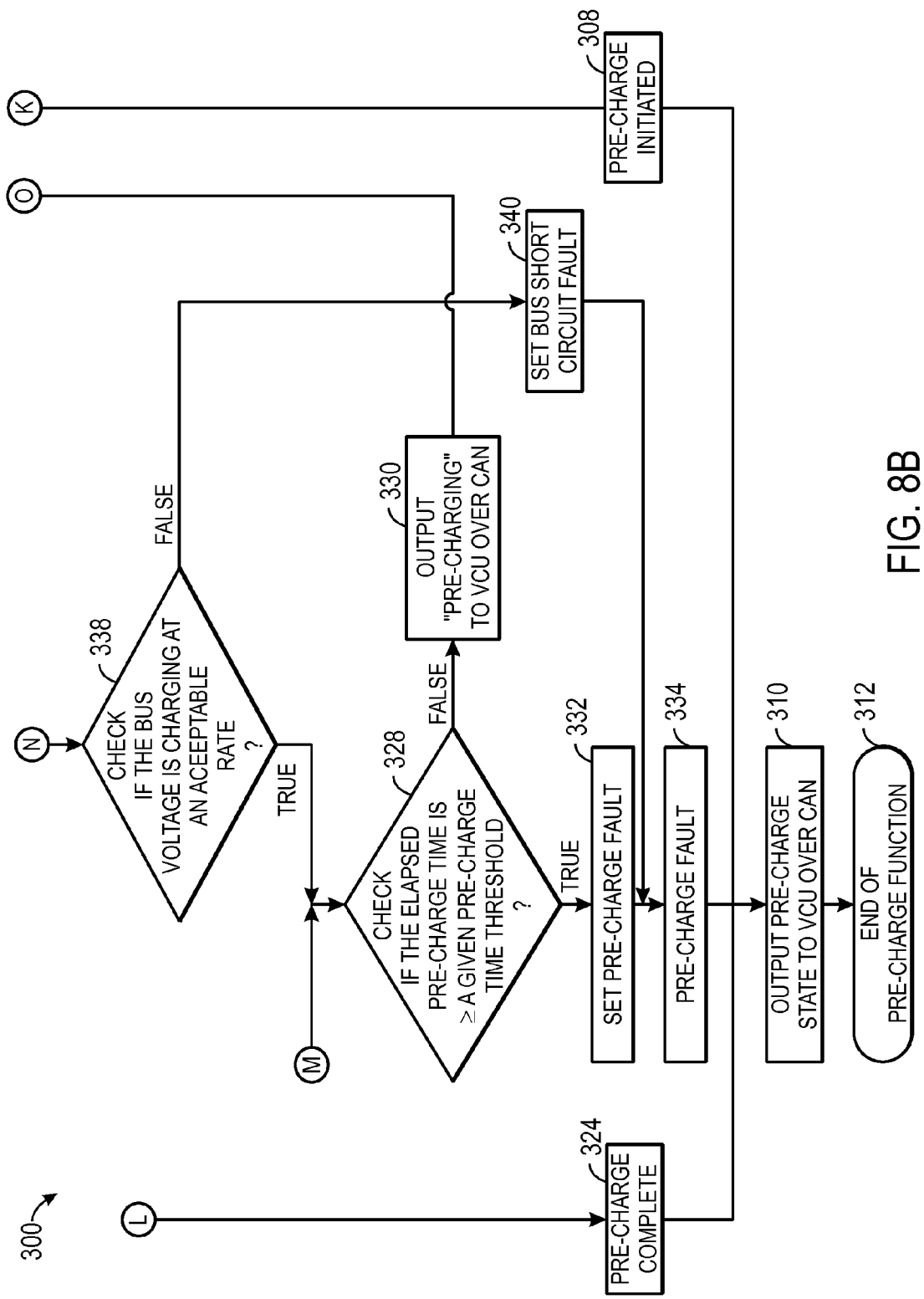

FIGS. 6A, 6B, and 6C are process diagrams illustrating the VCU pre-charge sequence for parallel batteries while the vehicle is in drive mode, in accordance with embodiments of the present disclosure;

FIGS. 7A, 7B, and 7C are process diagrams illustrating the VCU pre-charge sequence for parallel batteries while the vehicle is in charge mode, in accordance with embodiments of the present disclosure; and FIGS. 8A and 8B are process diagrams illustrating the BMU pre-charge diagnostic sequence during vehicle drive and charge mode, in accordance with embodiments of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

For the purposes of the present disclosure, it should be noted that the presently disclosed embodiments are particularly directed toward applications for xEV electric vehicles. In particular, the term "xEV" may be used to describe any vehicle that derives at least a portion of its motive power from an electric power source (e.g. a battery system). As will be appreciated by those skilled in the art, hybrid electric vehicles (HEVs) combine an internal combustion engine propulsion and high voltage battery power to create traction. The term HEV may include any variation of a hybrid electric vehicle, such as micro-hybrid and mild hybrid systems, which disable the internal combustion engine when the vehicle is idling and utilize a battery system to continue powering the air conditioning unit, radio, or other electronics, as well as to kick-start the engine when propulsion is desired. The mild hybrid system may apply some level of power assist to the internal combustion engine, whereas the micro-hybrid system may not supply power assist to the internal combustion engine. A plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid vehicles (PHEVs), and electric vehicle conversions of hybrid electric vehicles and conventional internal combustion engine vehicles. An electric vehicle (EV) is an all-electric vehicle that uses for its propulsion one or more motors powered by electric energy. The term "xEV" is defined herein to include all of the foregoing or any variations or combinations thereof that include electric power as a motive force.

As set forth above, battery packs for xEVs may include an electronic controller, such as a battery management unit (BMU), to monitor various parameters associated with the operation of the battery pack. For example, a BMU may monitor the temperature, pressure, current, voltage, capacity, and so forth, for the various battery modules and electro-chemical cells (e.g., NiMH and/or lithium-ion cells) of the battery pack using a number of sensors distributed throughout the battery pack. Additionally, the BMU may communicate the monitored parameters of the battery pack to a vehicle control unit (VCU), which may generally monitor the operation of the xEV and inform the driver and/or make adjustments to the operation of the xEV in response to the monitoring.

Accordingly, present embodiments are directed towards systems and methods for pre-charging the bus capacitance in xEVs using parallel battery packs. Systems and methods include BMUs for each battery pack and a VCU. The pre-charge routine is enabled by communications over a vehicle bus by the BMUs and the VCU. The BMUs use the vehicle bus communications to receive commands, send pack information, support diagnostics, and programming and calibration services. The VCU interprets the data that it receives from the BMUs and calculates data to be used for VCU control purposes. Based on the battery pack information reported by the BMUs, the VCU controls the pre-charge connection sequence. Furthermore, the BMUs have no direct communication with each other, allowing straightforward additions of parallel battery packs. For example, a battery pack or battery system, which was originally developed for use as a single string, may be rapidly adapted for use in a parallel string architecture with minimal engineering work. The systems and methods of the present embodiments are not limited to the listed applications. For example, the pre-charging methods described herein may be utilized in any system that uses battery packs, such as control systems, generators, and other battery-powered systems. Additionally, it should be noted that the present embodiments apply to both high voltage and low voltage systems.

Figure 1:
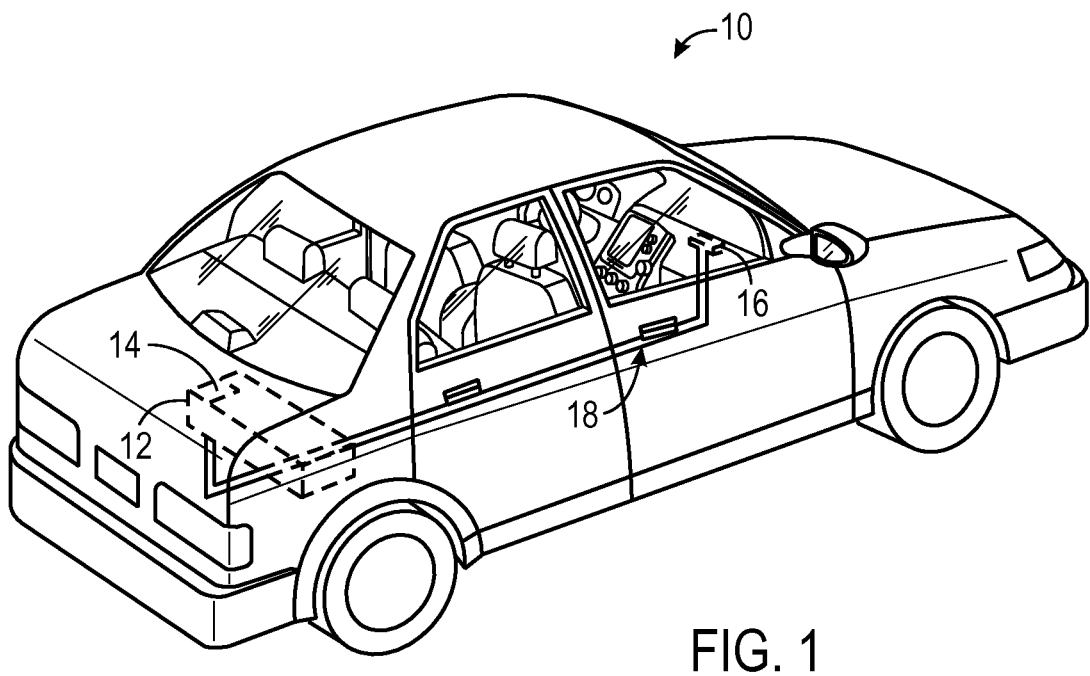
FIG. 1 is a perspective view of an xEV including a vehicle control unit (VCU), and a battery pack having a battery management unit (BMU), in accordance with an embodiment of the present disclosure.

With the foregoing in mind, FIG. 1 is a perspective view of an xEV 10 in accordance with an embodiment of a present disclosure. The illustrated xEV 10 may be any type of vehicle having a battery system for providing at least a portion of the motive power to propel the vehicle. For example, the xEV 10 may be an all-electric vehicle (EV), a hybrid electric vehicle (HEV), a plug-in hybrid electric vehicle (PHEV), or other type of vehicle using electric power to provide at least a portion of the propulsion for the vehicle. Although xEV 10 is illustrated as a car in FIG. 1, in other embodiments, other types of vehicles may be used with the present technique. For example, in other embodiments, the xEV 10 may be a truck, bus, industrial vehicle, motorcycle, recreational vehicle, boat, or any other type of vehicle that may move, at least partially, using electric power. Accordingly, xEV 10 includes a battery pack 12 capable of supplying electrical power to the xEV 10 that may be used to move the xEV 10, in addition to powering other features of the xEV 10 (e.g., lights, automatic windows, automatic locks, entertainment systems, and similar components and accessories of the xEV 10). It should be appreciated that the term "battery pack" as used herein may generally refer to a battery system that includes a number of electro-chemical cells and a BMU 14. It should also be appreciated that, in other embodiments, the BMU 14 may be a separate component (e.g., part of the xEV 10) that is coupled to the battery pack 12 upon installation. Furthermore, although the battery pack 12 illustrated in FIG. 1 is positioned in the trunk or rear of the xEV 10, in other embodiments, the battery pack 12 may be positioned elsewhere in the xEV 10. For example, battery pack 12 may be positioned based on the available space within the xEV 10, the desired weight balance of the xEV 10, the location of other components used with the battery pack 12 (e.g., battery management systems, vents or cooling devices, or similar systems), and similar engineering considerations.

In addition to the battery pack 12, including the BMU 14, the illustrated xEV 10 also has a vehicle control unit (VCU) 16. As mentioned above, the VCU 16 may generally monitor and control certain parameters of the xEV 10. For example, the VCU 16 may use a number of sensors to monitor the temperature inside the xEV 10, the temperature outside the xEV 10, the speed of the xEV 10, the load on the electric motor, and so forth. In certain embodiments, the VCU 16 may include sensors disposed about the xEV 10 to detect when a component of the xEV 10 is operating outside of a desired range (e.g., engine failure, transmission failure, battery failure, and so forth) and may, furthermore, notify the driver and/or disable components of the xEV 10 in response. For hybrid xEVs that include an internal combustion engine, such as HEVs and PHEVs, the VCU 16 may also monitor and control parameters of the internal combustion engine (e.g., oxygen content at the air intake, atmospheric pressure, remaining fuel, revolutions per minute, coolant temperature, and other factors affecting the performance and operation of the internal combustion engine) as well.

The BMU 14 and the VCU 16 communicate with each other over a vehicle bus 18. The vehicle bus 18 may comprise a system of wires configured to enable electrical signals to transmit data between the BMU 14 and the VCU 16 in the xEV 10. The communication between the BMU 14 and the VCU 16 may also be enabled through a wireless communication link. The BMU 14 and the VCU 16 may communicate over the vehicle bus 18 using a communications protocol such as the controller area network (CAN) protocol. CAN is a message-based protocol designed for use in automotive, aerospace, and industrial applications.

Figure 2:
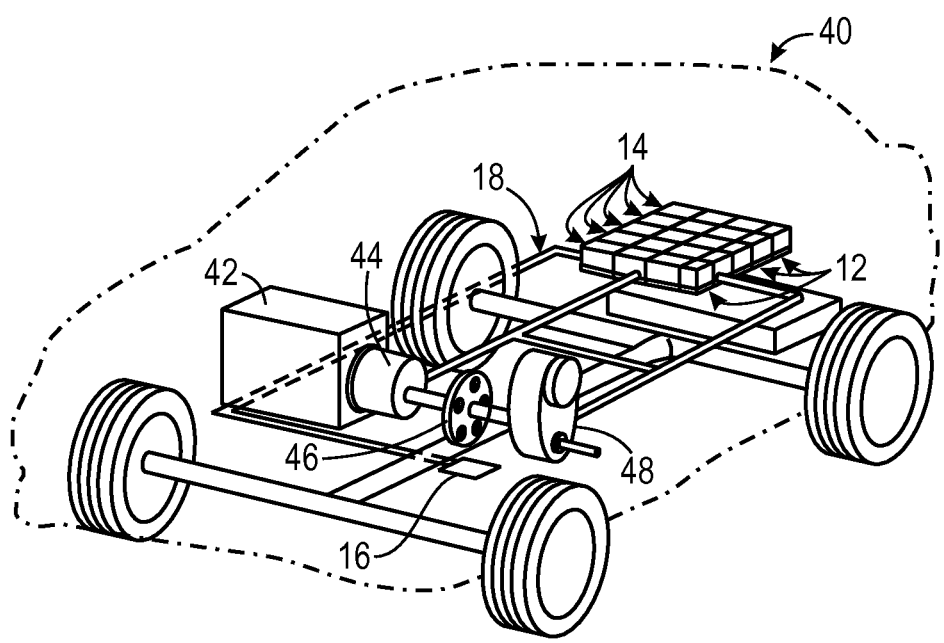
FIG. 2 is a cutaway schematic view of a hybrid electric vehicle (HEV) including battery packs with BMUs, in accordance with an embodiment of the present disclosure.

As mentioned above, xEVs, like the one illustrated in FIG. 1, may be divided into more specific sub-classes based on the internal design of the vehicle. FIG. 2 is a cutaway schematic view of a hybrid electric vehicle (HEV) 40 including battery packs with BMUs, in accordance with an example embodiment of the present approach. Like the xEV 10 illustrated in FIG. 1, the HEV 40 includes a battery pack 12 toward the rear of the HEV 40, proximate a fuel tank. In other embodiments, the battery pack 12 may be disposed in a separate compartment in the rear of the vehicle (e.g., a trunk), or another suitable location. In certain embodiments, a plurality of battery packs 12 connected in parallel may each comprise a BMU 14. Additionally, the HEV 40 includes an internal combustion engine 42, which may combust a hydrocarbon fuel to produce power that may be used to propel the HEV 40. Also, the HEV 40 is equipped with an electric motor 44 that is coupled to the battery pack 12 and is also used to propel the HEV 40. The illustrated HEV 40 is also equipped with a power split device 46, which allows a portion of the power (e.g., rotational energy) to be directed to a generator 48 suitable for charging the battery pack 12. It should be noted that other types of xEVs (e.g., EVs, HEVs, PHEVs, etc.) and other configurations (e.g., the type of vehicle, the type of vehicle technology, and the battery chemistry, among other configurations) may be used in various embodiments of the present disclosure.

Figure 3:
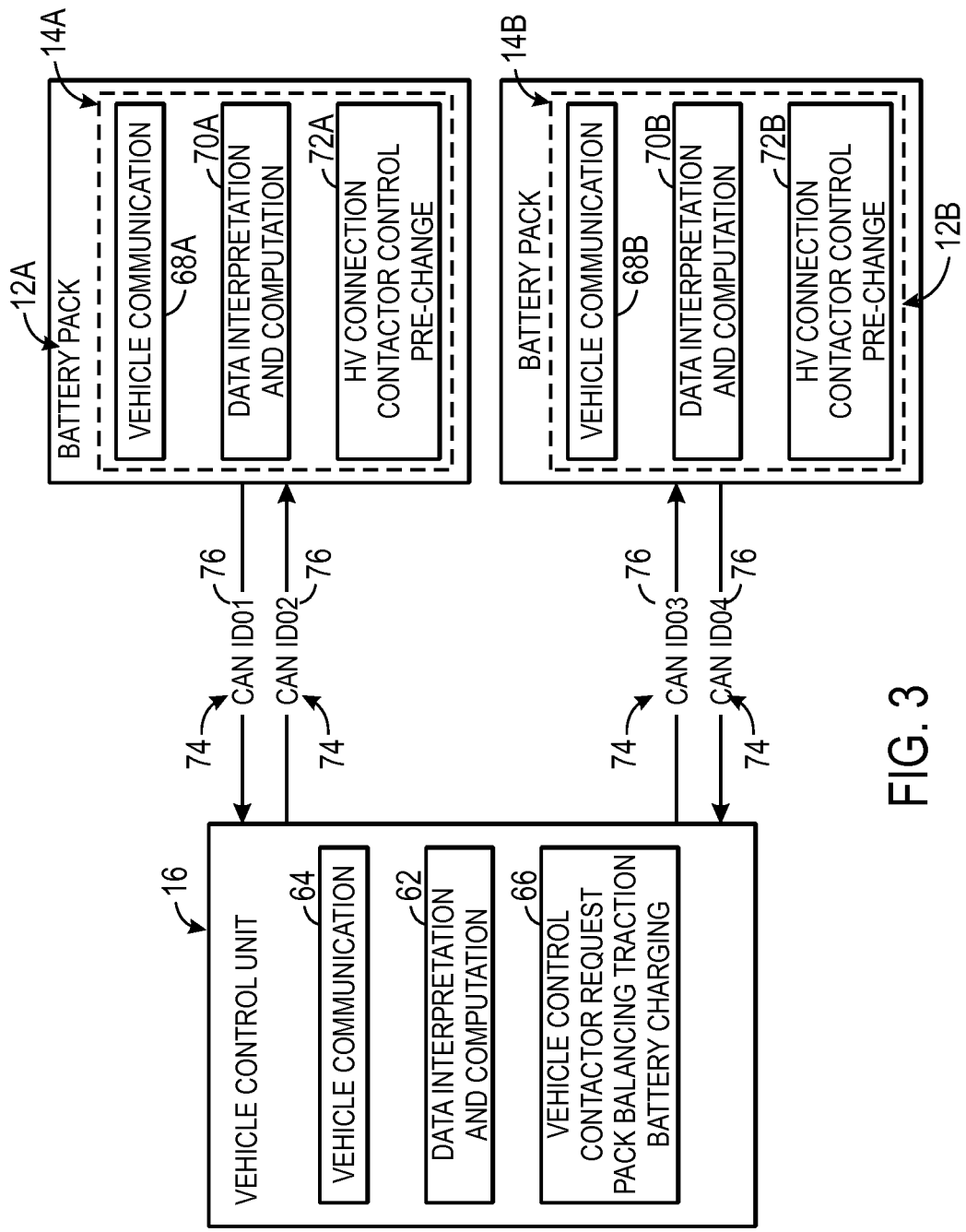
FIG. 3 is a diagram of the communication interface between the VCU and two BMUs in parallel, in accordance with an embodiment of the present disclosure.

The pre-charging of a system having two or more BMUs 14 presents some unique challenges, as compared to pre-charging a system having only one BMU 14. To address some of these challenges, multiple BMUs 14 may be arranged to communicate with the VCU 16 independently of one another, as illustrated in FIG. 3. The VCU 16 may include a data interpretation and computation module 62 for interpreting data received from the BMUs 14 or other devices in the xEV 10 and for calculating commands to send to the BMUs 14. The data interpretation and computation module 62 may send commands using vehicle communication circuitry 64 with a communications protocol, such as CAN. Additionally, the data interpretation and computation module 62 may perform decision-making operations and issue commands to a vehicle control module 66 to perform operations such as opening and closing battery pack contactors, operating circuitry to balance the battery pack loading, and enabling battery pack charging, among other operations. The data interpretation and computation module 62 and the vehicle control module 66 may be implemented in instructions stored on computer-readable non-transitory media that may be executed by a suitable processing device, such as the VCU 16.

The VCU 16 may be communicatively connected to two or more battery packs 12 including a BMU 14. The diagram of FIG. 3 illustrates two battery packs 12A and 12B each including a BMU 14A and 14B. The BMU 14A and 14B of each battery pack 12A and 12B may include vehicle communication circuitry 68A and 68B to send and receive data and commands over the vehicle bus 18 using the CAN protocol as mentioned above. To interpret the data received by the vehicle communication circuitry 68A and 68B, the BMU 14A and 14B may include respective data interpretation and computation modules 70A and 70B. Additionally, the data interpretation and computation modules 70A and 70B may calculate data to be sent to the VCU 16 and issue commands to high voltage (HV) connection circuitry 72A and 72B of the respective battery packs 12A and 12B. The HV connection circuitry 72 may include contactors to connect the respective battery pack 12A and 12B to the bus capacitance of the xEV 10 as well as pre-charge contactors for connecting the respective battery pack 12A and 12B to a pre-charge circuit for pre-charging the bus capacitance of the xEV 10.

CAN messages 74 may be sent to transmit data and commands between each BMU 14A and 14B and the VCU 16. Each CAN message 74 may include a unique ID 76 to enable the VCU 16 to determine the particular BMU 14A or 14B for which the data and commands are intended. The unique IDs 74 may include a string of characters to uniquely identify each BMU 14A and 14B and allow the VCU 16 to collect data from and send commands to multiple independent BMUs 14A and 14B. The independent BMUs 14 may enable connecting a single string battery pack to be used in the parallel configuration mentioned above without additional complexity.

Figure 4:
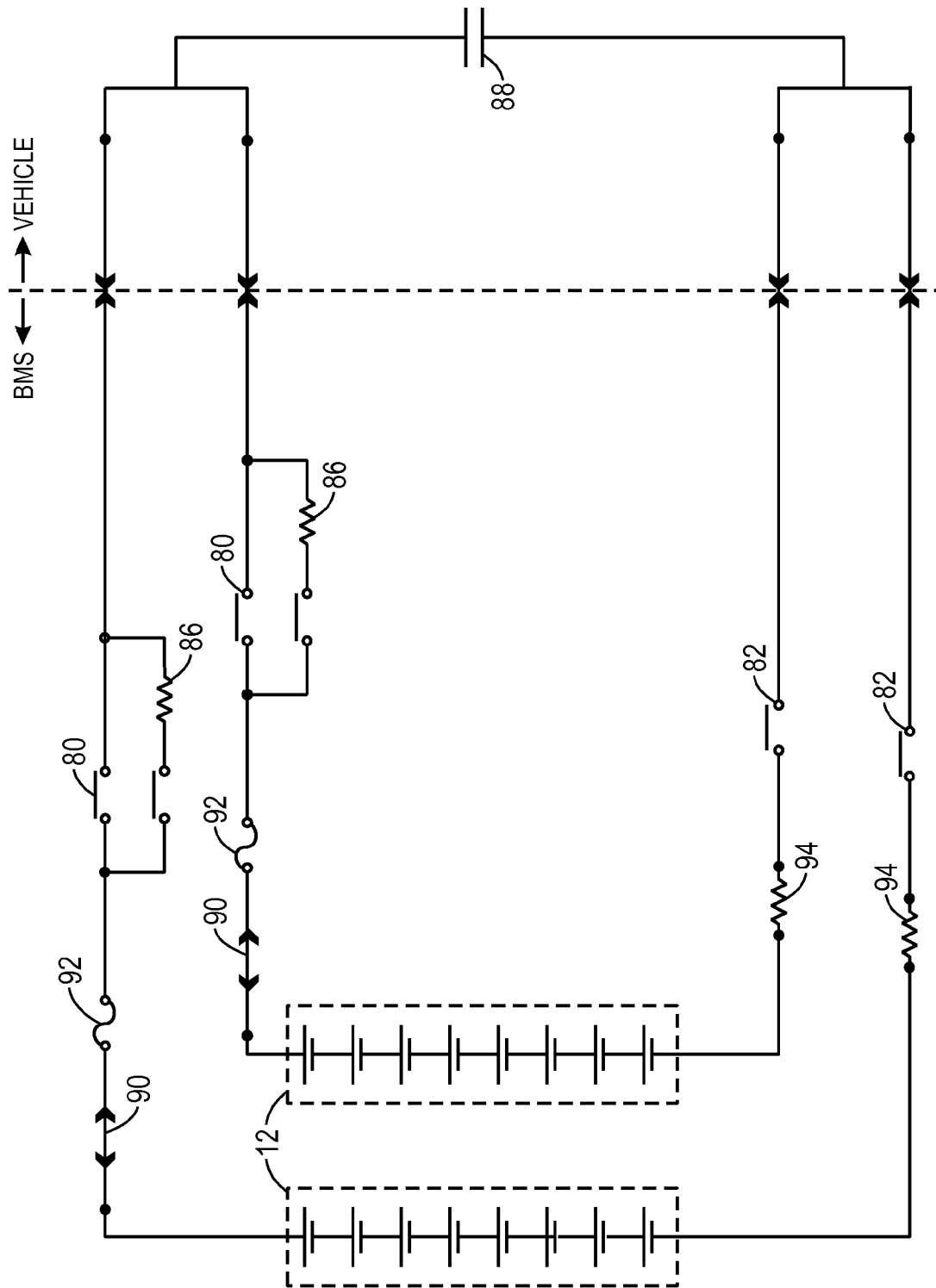
FIG. 4 is a pre-charge circuit diagram with two battery packs connected in parallel, in accordance with an embodiment of the present disclosure.

The circuit diagram illustrated in FIG. 4 shows more detail of the HV connection circuitry 72 of FIG. 3. The HV connection circuitry 72 may include positive main contactors 80 and negative main contactors 82. These contactors 80 and 82 are designed to close to allow current to flow from the battery packs 12 to the bus capacitance of the xEV 10 and to open to effectively cut off the battery packs 12A and 12B from the bus capacitance of the xEV 10. The positive main contactors 80 and the negative main contactors 82 may be opened and closed in response to signals from the BMUs 14A and 14B. Additionally, the connection circuitry 72 may comprise pre-charge contactors 84 electrically coupled in parallel with the positive main contactors 80. The pre-charge contactors 84 may be electrically coupled in series with pre-charge resistors 86 to force current to flow through the pre-charge resistors 86 when the pre-charge contactors 84 are closed and the main contactors 80, 82 are open. The pre-charge resistors 86 may be designed to limit the current flowing to a capacitor 88 representing the bus capacitance of the xEV 10.

Before pre-charging occurs, the positive main contactors 80, negative main contactors 82, and the pre-charge contactors 86 may be open to disconnect the battery packs 12A and 12B from the bus capacitance (capacitor 88). The VCU 16 may send a command to the BMUs 14A and 14B over the vehicle bus 18 to begin pre-charging the power system by closing the negative main contactors 82 and the pre-charge contactors 84, effectively allowing current to flow from the battery packs 12A and 12B through the pre-charge resistors 86 and into the bus capacitance of the xEV 10. The pre-charge resistors 86 may limit the inrush current flowing from the battery packs 12A and 12B to the bus capacitance that could potentially weld the positive main contactors 80 and the negative main contactors shut 82 and damage the battery packs 12, the power system of the xEV 10, or both.

In certain embodiments, the VCU 16 may close the pre-charge contactor 84 for only a single battery pack 12A and 12B. After the bus capacitance (capacitor 88) is sufficiently charged, each BMU 14A and 14B may send a CAN message 74 to the VCU 16 notifying the completion of the pre-charge. The VCU 16 may process the CAN message 74 and send back a CAN message 74 with a command to open the pre-charge contactors 84 and close the positive main contactors 80 to allow normal operation between the battery packs 12A and 12B and the bus capacitance of the xEV 10. The value of capacitor 88 may determine how much time may elapse during a pre-charge sequence.

In addition to the pre-charge circuitry, the connection circuitry 72 may include a service disconnect 90 configured to allow a worker to manually disconnect the battery packs 12 from the connection circuitry 72. A main fuse 92 may be in series with the service disconnect 90 and may be configured to form an open circuit in the case a current flows from the battery packs 12 that would potentially damage the battery packs 12 or the bus capacitance of the xEV 10. The BMU 14 of each battery pack 12 may comprise a resistor forming a current shunt 94 in series with the battery packs 12. Since the current shunt 94 is a constant resistance, measuring the voltage across the current shunt 94 may allow each BMU 14 to monitor the current flowing from each respective battery pack 12.

Figure 5:
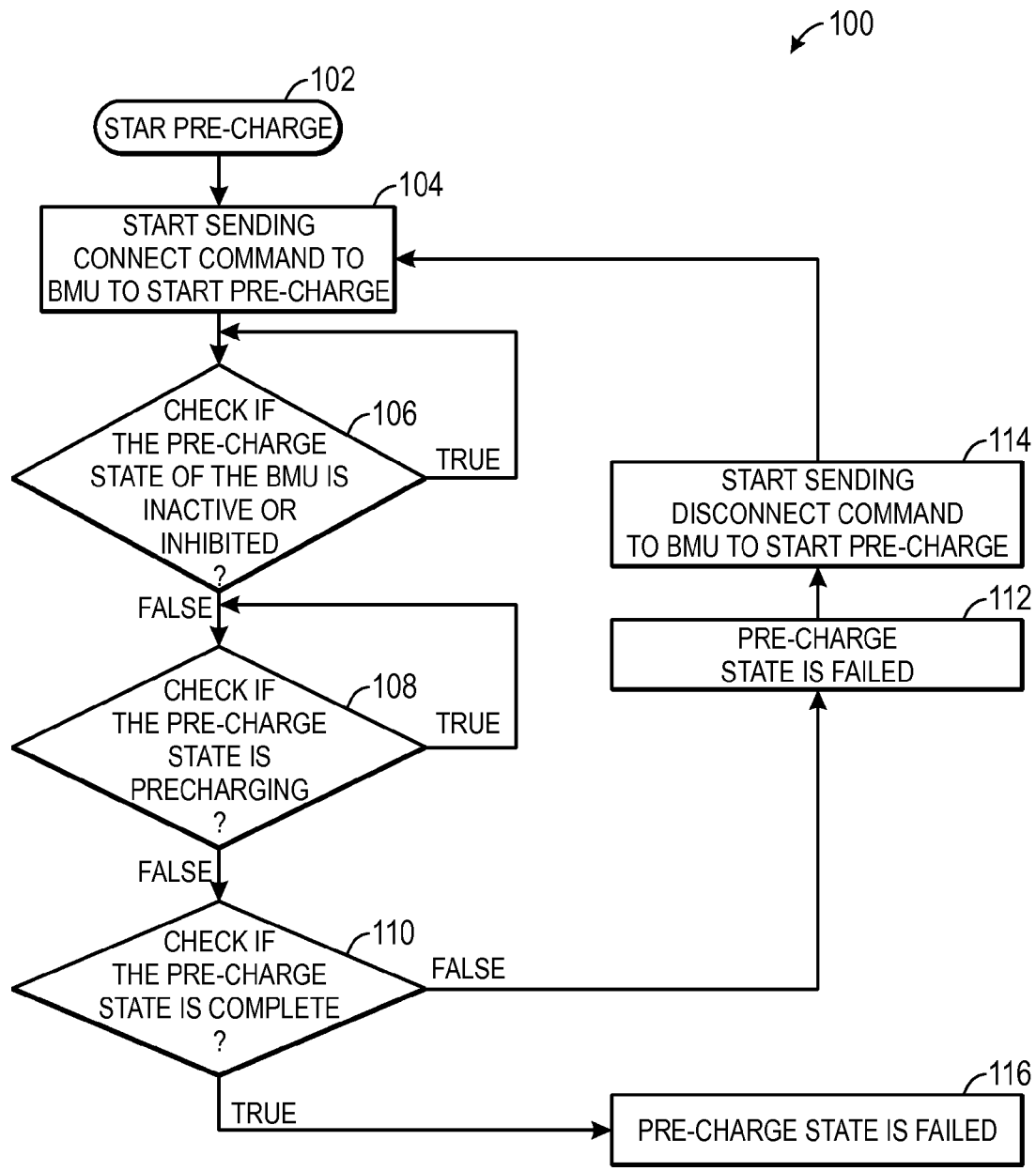
FIG. 5 is a process diagram illustrating the VCU single string pre-charge sequence, in accordance with an embodiment of the present disclosure.

To determine when the main contactors 80, 82 and the pre-charge contactors 84 of each BMU 14A and 14B should be opened or closed, the data interpretation and computation module 62 of the VCU 16 may include logic steps defining a pre-charge sequence. To illustrate the pre-charge sequence logic of the data interpretation and computation module 62 of the VCU 16, FIG. 5 illustrates a process diagram 100 of the VCU single string pre-charge sequence in accordance with an embodiment of the present technique. A single string pre-charge sequence may occur between a single BMU 14A and 14B and the VCU 16. The outcome of the single string pre-charge sequence may be a single battery pack 12A and 12B having pre-charged the bus capacitance in the xEV 10. As represented by block 102, the VCU 16 may determine that a pre-charge sequence should be started. A pre-charge sequence may be started any time that battery packs 12A and 12B may be connected to an uncharged bus capacitance. The VCU 16 may send a CONNECT DRIVE command to the BMU 14 to start the pre-charge, as represented by block 104. The VCU 16 may send the CONNECT DRIVE command at varying time intervals or periodically, such as every 20 milliseconds. Once the BMU 14 receives the CONNECT DRIVE command, it may undergo the pre-charge diagnostic sequence shown later in FIG. 8 to determine the pre-charge state of the battery pack 12.

The possible pre-charge states of the battery pack 12 may be INACTIVE, INHIBIT, OR PRECHARGE. The battery pack 12 may be in the INACTIVE state before a CONNECT DRIVE command is sent from the VCU 16. Once the CONNECT DRIVE command is received, the BMU 14 may set the pre-charge state of the battery pack 12 to INHIBIT if there is an internal isolation fault, a battery voltage sensing fault, a short circuit fault in the bus capacitance, a hardware fault in the bus capacitance, or a combination thereof. Likewise, the BMU 14 may set the pre-charge state of the battery pack 12 to INHIBIT if the battery pack 12 temperature is out of a pre-determined range, if the battery pack 12 voltage is below a pre-determined value, if a lock-out time for the battery pack 12 has not elapsed, if a CAT6 or CAT7 fault is set, if a positive main contactor 86 or a negative main contactor 88 is short circuited to ground, if an open circuit fault is set, if a short circuit to battery fault is set for a positive main contactor 86, a negative main contactor 88, or a pre-charge contactor 90, if a minimum state of charge of the battery pack 12 is at a minimum limit, or any combination thereof. A CAT6 fault may include a critical fault that requires the battery pack 12 to be disconnected from the vehicle power system in 1-2 seconds for safety reasons. A CAT7 fault may include a critical fault that requires the battery pack 12 to be immediately disconnected from the vehicle power system due to a hardware fault. The BMU 14 may set the pre-charge state of the battery pack 12 to PRECHARGE if the battery pack 12 is able to begin pre-charging.

The VCU 16 may receive the pre-charge state of the battery pack 12 from the BMU 14. As represented by block 106, the VCU 16 may check if the pre-charge state of the BMU 14 is INACTIVE or INHIBITED. If the pre-charge state of the BMU 14 is INACTIVE or INHIBITED, the VCU 16 may continue to periodically send the CONNECT DRIVE command to the BMU 14 and check the pre-charge state of the BMU 14. The VCU 16 may also send the CONNECT DRIVE command and check the pre-charge states of the BMUs 14 at time intervals of varying lengths. When the BMU 14 state is no longer INACTIVE or INHIBITED, the VCU 16 may begin checking if the pre-charge state of the BMU 14 is PRECHARGING, as represented by block 108. The VCU 16 may continue to check the pre-charge state of the BMU 14 until the battery pack 12 is done pre-charging and the state of the BMU 14 is no longer PRECHARGING. Once the state of the BMU 14 is no longer PRECHARGING, the pre-charge state of the BMU 14 may be either COMPLETE or FAILED. The BMU 14 may set the pre-charge state of the battery pack 12 to COMPLETE if the pre-charge was completed successfully. The BMU 14 may set the pre-charge state of the battery pack 12 to FAILED if there was a failure to connect to the bus capacitance due to hardware faults in the battery pack 12, if the bus capacitance contains a short, if the battery pack 12 has a low cell voltage or temperature, if the battery pack 12 voltage is less than a minimum limit, if the number of pre-charge attempts exceeds a pre-determined limit within a pre-determined amount of time, if an internal isolation fault occurs, if a voltage sensing fault occurs, or any combination thereof.

As represented by block 110, the VCU 16 may check if the pre-charge state of the BMU 14 is COMPLETE. If the pre-charge state of the BMU 14 is not COMPLETE, the pre-charge state is inherently FAILED, as represented by block 112. The VCU 16 may start sending a DISCONNECT command to the BMU 14 to restart the pre-charge sequence, as represented by block 114. The DISCONNECT command may be sent to the BMU 14 at varied time intervals or periodically, such as every 20 milliseconds. If the pre-charge state of the BMU 14 is COMPLETE, the pre-charge is complete, as represented by block 116.

As mentioned, FIG. 5 illustrates a process diagram 100 for the VCU single string pre-charge sequence. However, to pre-charge with more than one battery pack 12, the VCU 16 may execute a more complex pre-charge sequence, although each time a single string pre-charge sequence is executed within this more complex sequence, it follows the process described with respect to FIG. 5. FIGS. 6A, 6B, and 6C show a process diagram 120 illustrating the VCU pre-charge sequence for parallel batteries while the vehicle is in drive mode, or any other mode that may enable discharge of the battery packs 12. In the present embodiment, the process diagram 120 may illustrate the VCU pre-charge sequence for two battery packs 12A and 12B in parallel. The first battery pack 12A may be referred to as battery pack A, and the second battery pack 12B may be referred to as battery pack B. Other processes may be derived from process diagram 120 for more than two battery packs 12A and 12B. As represented by block 122 of FIG. 6A, the VCU 16 may determine that a pre-charge sequence should be started. As mentioned before, a pre-charge sequence may be started any time that disconnected battery packs 12A and 12B may be connected to an uncharged bus capacitance. If a difference in the terminal voltages of battery packs 12A and 12B connected in parallel is significant, a surge current may flow from the battery packs 12 potentially damaging the electronics of the battery packs 12 or the bus capacitance of the xEV 10. As represented by block 124 of FIG. 6A, the VCU 16 may determine if a difference in the terminal voltages of the battery packs 12 is less than or equal to a pre-determined voltage threshold, such as 3 volts or a percentage of the terminal voltage of the battery pack with the higher terminal voltage. If the difference in the terminal voltages of the battery packs 12 is below a pre-determined voltage threshold, the VCU 16 may start sending the CONNECT DRIVE command to battery pack A and battery pack B to start the pre-charge sequence, as represented by blocks 126 and 128 of FIG. 6A. The VCU 16 may send the CONNECT DRIVE command to each battery pack 12 at varied time intervals or periodically, such as every 20 milliseconds. Once BMU A and BMU B receive the CONNECT DRIVE command, they may execute the pre-charge diagnostic sequence shown in FIG. 8 to determine the pre-charge state of the battery packs 12.

Once the BMUs 14 complete the pre-charge diagnostic sequence, they may send the pre-charge state to the VCU 16. As represented by block 130 of FIG. 6A, the VCU 16 may check if the pre-charge states of both BMU A and BMU B are INACTIVE or INHIBITED. If the pre-charge states of both BMU A and BMU B are INACTIVE or INHIBITED, the VCU 16 may continue to periodically send the CONNECT DRIVE command to the BMUs 14 and check the pre-charge states of the BMUs 14. The VCU 16 may also send the CONNECT DRIVE command and check the pre-charge states of the BMUs 14 at time intervals of varying lengths. When the state of either one of BMU A or BMU B is no longer INACTIVE or INHIBITED, the VCU 16 may begin checking if the pre-charge state of either one of BMU A or BMU B is PRECHARGING, as represented by block 132 of FIG. 6A. The VCU 16 may continue to check the pre-charge states of BMU A and BMU B until either one of BMU A or BMU B is done pre-charging and the state of BMU A or BMU B is no longer PRECHARGING.

Once the state of either one of BMU A or BMU B is no longer PRECHARGING, the pre-charge state of at least one of BMU A or BMU B may be COMPLETE. The VCU 16 may check if the pre-charge states of both BMU A and BMU B are COMPLETE, as represented by block 134 of FIG. 6A. If so, the pre-charge sequence may be complete with both packs pre-charged in parallel (block 136). If the pre-charge state of either one of BMU A or BMU B is not COMPLETE, the VCU 16 may check if the pre-charge state of BMU A is COMPLETE (block 138). If the pre-charge state of BMU A is COMPLETE, the pre-charge sequence may be complete with a single string pre-charge by battery pack A (block 140). Alternatively, if the pre-charge state of BMU A is not COMPLETE, the VCU 16 may check if the pre-charge state of BMU B is COMPLETE (block 142). If the pre-charge state of BMU B is COMPLETE, the pre-charge sequence may be complete with a single string pre-charge by battery pack B (block 144). However, if the pre-charge state of BMU B is not complete, the pre-charge may have failed, as represented by block 146 of FIG. 6A. In the case of pre-charge failure, the VCU 16 may then start sending the DISCONNECT command to BMU A and BMU B, as represented by block 148 of FIG. 6A. The VCU 16 may send the DISCONNECT command at varied time intervals or periodically, such as every 20 milliseconds.

As mentioned before, parallel pre-charging with battery packs that have substantially different terminal voltages may cause a surge current that may damage the battery packs 12 or the electrical components of the bus capacitance of the xEV 10. Therefore, referring back to block 124 of FIG. 6A, if the difference in the terminal voltages of the battery packs 12 is greater than the pre-determined voltage threshold, the VCU 16 may check which battery pack 12 has a higher terminal voltage, as represented by block 150 of FIG. 6B. If battery pack A has a higher terminal voltage, the VCU 16 may perform the single string pre-charge sequence 152 illustrated by process diagram 100 in FIG. 5 on battery pack A. The battery pack 12 with the higher terminal voltage is initially chosen for the pre-charge sequence because pre-charging may lower the terminal voltage of the battery pack 12 nearer to the terminal voltage of the other battery pack 12. After the single string pre-charge sequence is complete, the VCU 16 may check if the pre-charge state of BMU A is COMPLETE, as represented by block 154 of FIG. 6B. If the pre-charge state of BMU A is not COMPLETE, the VCU 16 may perform the single string pre-charge sequence 156 illustrated by process diagram 100 in FIG. 5 on battery pack B. After the single string pre-charge sequence is complete, the VCU 16 may check if the pre-charge state of BMU B is COMPLETE (block 158). If the pre-charge state of BMU B is COMPLETE, the pre-charge sequence is complete with single string charging with the battery pack with the lower terminal voltage (battery pack B), as represented by block 160 of FIG. 6B. However, if the pre-charge state of BMU B is not COMPLETE, the pre-charge sequence failed and faults may be set in BMU A and BMU B, as represented by block 162 of FIG. 6B.

At block 154, if the pre-charge state of battery pack A is COMPLETE, the VCU 16 may check if the difference of the terminal voltages of the battery packs 12 is less than or equal to a pre-determined voltage threshold, as represented by block 164 of FIG. 6B. If not, the VCU 16 may indicate to a driver of the xEV 10 that battery pack B may need to be charged, as represented by block 166 of FIG. 6B. The VCU 16 may indicate to the driver of the xEV 10 that battery pack B may need to be charged using an instrument cluster. As represented by block 168 of FIG. 6B, the pre-charge sequence is complete with single string charging with the battery pack with the higher terminal voltage (battery pack A).

At block 164, if the difference of the terminal voltages of the battery packs 12 is less than or equal to a pre-determined voltage threshold, the VCU 16 may perform the single string pre-charge sequence 170 illustrated by process diagram 100 in FIG. 5 on battery pack B. The VCU 16 may then check if the pre-charge state of BMU B is COMPLETE, as represented by block 172 of FIG. 6B. If not, the pre-charge sequence is complete with single string charging with the battery pack with the higher terminal voltage (battery pack A) (block 168). If so, the pre-charge sequence is complete with dual string charging with the battery pack with the higher terminal voltage (battery pack A) charged first (block 174).

Referring back to block 150 of FIG. 6B, if battery pack B has a higher terminal voltage, the VCU 16 may perform the single string pre-charge sequence 176 illustrated by process diagram 100 in FIG. 5 on battery pack B. As mentioned above, the battery pack with the higher voltage is used for pre-charging first to lower the terminal voltage to be closer to the terminal voltage of the other battery pack 12. After the single string pre-charge sequence is complete, the VCU 16 may check if the pre-charge state of BMU B is COMPLETE (block 178). If the pre-charge state of BMU B is not COMPLETE, the VCU 16 may perform the single string pre-charge sequence 180 illustrated by process diagram 100 in FIG. 5 on battery pack A. After the single string pre-charge sequence is complete, the VCU 16 may check if the pre-charge state of BMU A is COMPLETE (block 182). If the pre-charge state of BMU A is COMPLETE, the pre-charge sequence is complete with single string charging with the battery pack with the lower terminal voltage (battery pack A) (block 160). If the pre-charge state of BMU A is not COMPLETE, the pre-charge sequence failed and faults may be set in BMU A and BMU B (block 162).

At block 178 of FIG. 6C, if the pre-charge state of battery pack B is COMPLETE, the VCU 16 may check if the difference of the terminal voltages of the battery packs 12 is less than or equal to a pre-determined voltage threshold, as represented by block 184 of FIG. 6C. If not, the VCU 16 may indicate to a driver of the xEV 10 that battery pack A may need to be charged, as represented by block 186 of FIG. 6C. The VCU 16 may indicate to the driver of the xEV 10 that battery pack A may need to be charged using an instrument cluster. As represented by block 168 of FIG. 6B, the pre-charge sequence is complete with single string charging with the battery pack with the higher terminal voltage (battery pack B).

At block 184 of FIG. 6C, if the difference of the terminal voltages of the battery packs 12A and 12B is less than or equal to a pre-determined voltage threshold, the VCU 16 may perform the single string pre-charge sequence 188 illustrated by process diagram 100 in FIG. 5 on battery pack A. The VCU 16 may then check if the pre-charge state of BMU A is COMPLETE, as represented by block 190 of FIG. 6C. If not, the pre-charge sequence is complete with single string charging with the higher pack voltage (battery pack B) (block 168). If so, the pre-charge sequence is complete with dual string charging with the battery pack with the higher terminal voltage (battery pack B) charged first, as represented by block 174 of FIG. 6C.

When an xEV 10 is charging its battery packs 12A and 12B, the pre-charge sequence may be modified so that batteries with lower terminal voltages (and thus less charge) have priority for returning to being charged. The battery pack 12 with the lower terminal voltage is used for pre-charging first so that it can charge to have a terminal voltage level substantially equal to the battery pack 12 with the higher terminal voltage before the battery pack 12 with the higher terminal voltage is used for pre-charging. Accordingly, FIGS. 7A, 7B, and 7C show a modified process diagram 200 illustrating the VCU pre-charge sequence for parallel batteries while the vehicle is in charge mode rather than drive mode (FIGS. 6A, 6B, and 6C). In the present embodiment, the process diagram 200 may illustrate the VCU pre-charge sequence for two battery packs 12A and 12B in parallel. The first battery pack 12A may be referred to as battery pack A, and the second battery pack 12B may be referred to as battery pack B. Other processes may be derived from process diagram 200 for more than two battery packs 12A and 12B. As represented by block 202 of FIG. 7A, the VCU 16 may determine that a pre-charge sequence should be started. As previously mentioned, a pre-charge sequence may be started any time that disconnected battery packs 12 may be connected to an uncharged bus capacitance. As represented by block 204 of FIG. 7A, the VCU 16 may set charge currents for battery packs 12A and 12B to zero so that a battery pack 12 is not charging and pre-charging simultaneously. After suspending charging, the VCU 16 determines if a difference in the terminal voltages of the battery packs 12A and 12B is less than or equal to a pre-determined voltage threshold ($\Delta V_{AB}$), as represented by block 206 of FIG. 7A. The pre-determined voltage threshold may be a percentage of the voltage of the battery pack 12 with the higher terminal voltage. For example, in a certain embodiment, if the terminal voltage of the battery pack 12 with the higher terminal voltage is 120 volts, the pre-determined voltage threshold may be 3% of the 120 volts, or 3.6 volts. As mentioned above, if the terminal voltages of each battery pack 12A and 12B are substantially different, current may flow from the battery pack 12 that has a higher terminal voltage to the battery pack 12 with the lower terminal voltage, impeding the pre-charge sequence. If the difference in the terminal voltages of the battery packs 12 is below the pre-determined voltage threshold, the VCU 16 may start sending the CONNECT CHARGE command to battery pack A and battery pack B to start the pre-charge sequence, as represented by blocks 208 and 210 of FIG. 7A. The VCU 16 may send the CONNECT CHARGE command to each battery pack 12A and 12B at varied time intervals or periodically, such as every 20 milliseconds. Once BMU A and BMU B receive the CONNECT CHARGE command, they may execute the pre-charge diagnostic sequence illustrated in FIG. 8 to determine the pre-charge state of the battery packs 12A and 12B.

The VCU 16 may receive the pre-charge state of the battery packs 12 from BMU A and BMU B. As represented by block 212 of FIG. 7A, the VCU 16 may check if the pre-charge states of both BMU A and BMU B are INACTIVE or INHIBITED. If the pre-charge states of both BMU A and BMU B are INACTIVE or INHIBITED, the VCU 16 may continue to periodically send the CONNECT CHARGE command to the BMUs 14 and check the pre-charge states of the BMUs 14. The VCU 16 may also send the CONNECT DRIVE command and check the pre-charge states of the BMUs 14 at time intervals of varying lengths. When the state of either one of BMU A or BMU B is no longer INACTIVE or INHIBITED, the VCU 16 may begin checking if the pre-charge state of either one of BMU A or BMU B is PRECHARGING, as represented by block 214 of FIG. 7A. The VCU 16 may continue to check the pre-charge states of BMU A and BMU B until either one of BMU A or BMU B is done pre-charging and the state of BMU A or BMU B is no longer PRECHARGING.

Once the state of either one of BMU A or BMU B is no longer PRECHARGING, the pre-charge state of at least one of BMU A or BMU B may be COMPLETE. The VCU 16 may check if the pre-charge states of both BMU A and BMU B are COMPLETE (block 216). If so, the pre-charge sequence may be complete with both packs pre-charged in parallel, as represented by block 218 of FIG. 7A. Both BMU A and BMU B may continue charging after the parallel pre-charge sequence is complete. If the pre-charge state of either one of BMU A or BMU B is not COMPLETE, the VCU 16 may check if the pre-charge state of BMU A is COMPLETE, as represented by block 220 of FIG. 7A. If the pre-charge state of BMU A is COMPLETE, the pre-charge sequence may be complete with a single string pre-charge by battery pack A (block 222). Battery pack A may continue charging after the single string pre-charge sequence is complete with battery pack A. If the pre-charge state of BMU A is not COMPLETE, the VCU 16 may check if the pre-charge state of BMU B is COMPLETE, as represented by block 224 of FIG. 7A. If the pre-charge state of BMU B is COMPLETE, the pre-charge sequence may be complete with a single string pre-charge by battery pack B (block 226). Battery pack B may continue charging after the single string pre-charge sequence is complete with battery pack B. If the pre-charge state of BMU B is not complete, the pre-charge may have failed, as represented by block 228 of FIG. 7A. The VCU 16 may indicate to the driver of the xEV 10 that the battery packs 12 may not be charging using an instrument cluster. The VCU 16 may start sending the DISCONNECT command to BMU A and BMU B, as represented by block 230 of FIG. 7A. The VCU 16 may send the DISCONNECT command at varying time intervals or periodically, such as every 20 milliseconds.

As explained above, the pre-charge sequence while an xEV 10 is charging its battery packs 12 may be modified to initially pre-charge with the battery pack 12 that has a lower terminal voltage. At block 206 of FIG. 7A, if the difference in the terminal voltages of the battery packs 12 is greater than the pre-determined voltage threshold, the VCU 16 may check which battery pack 12 has a higher terminal voltage, as represented by block 232 of FIG. 7B. If battery pack B has a higher terminal voltage, the VCU 16 may perform the single string pre-charge sequence 234 illustrated by process diagram 100 in FIG. 5 on battery pack A. After the single string pre-charge sequence is complete, the VCU 16 may check if the pre-charge state of BMU A is COMPLETE (block 236). If the pre-charge state of BMU A is not COMPLETE, the VCU 16 may perform the single string pre-charge sequence 238 illustrated by process diagram 100 in FIG. 5 on battery pack B. After the single string pre-charge sequence is complete, the VCU 16 may check if the pre-charge state of BMU B is COMPLETE (block 240). If the pre-charge state of BMU B is COMPLETE, the pre-charge sequence is complete with single string charging with the battery pack with the higher terminal voltage (battery pack B), as represented by block 242 of FIG. 7B. Battery pack B may continue charging after the pre-charge sequence is complete with single string charging with battery pack B. If the pre-charge state of BMU B is not COMPLETE, the pre-charge sequence failed and the driver of the xEV 10 may be notified that BMU A and BMU B are not being charged, as represented by block 244 of FIG. 7B.

At block 236 of FIG. 7B, if the pre-charge state of battery pack A is COMPLETE, battery pack A may continue to charge (block 246). The VCU 16 may check if the difference of the terminal voltages of the battery packs 12 is less than or equal to a pre-determined voltage threshold, as represented by block 248 of FIG. 7B. If not, battery pack A will continue to charge until the difference of the terminal voltages of the battery packs 12 is within the pre-determined voltage threshold. If the difference of the terminal voltages of the battery packs 12 is less than or equal to the pre-determined voltage threshold, the VCU 16 may perform the single string pre-charge sequence 250 illustrated by process diagram 100 in FIG. 5 on battery pack B. The VCU 16 may check if the pre-charge state of BMU B is COMPLETE (block 252). If not, battery pack A may continue to charge as represented in block 246, and the sequence may repeat the steps represented in blocks 248, 250, and 252 of FIG. 7B. If the pre-charge state of BMU B is COMPLETE, the pre-charge sequence is complete with dual string charging with the battery pack with the lower terminal (battery pack A) voltage charged first, as represented by block 254 of FIG. 7B. After the dual string pre-charge sequence is complete, battery pack A and battery pack B may continue charging.

Referring back to block 232 of FIG. 7B, if battery pack A has a higher terminal voltage, the VCU 16 may perform the single string pre-charge sequence 256 illustrated by process diagram 100 in FIG. 5 on battery pack B. After the single string pre-charge sequence is complete, the VCU 16 may check if the pre-charge state of BMU B is COMPLETE, as represented by block 258 of FIG. 7C. If the pre-charge state of BMU B is not COMPLETE, the VCU 16 may perform the single string pre-charge sequence 260 illustrated by process diagram 100 in FIG. 5 on battery pack A. After the single string pre-charge sequence is complete, the VCU 16 may check if the pre-charge state of BMU A is COMPLETE (block 262). If the pre-charge state of BMU A is COMPLETE, the pre-charge sequence is complete with single string charging with the battery pack with the higher terminal voltage (battery pack A), as represented by block 264 of FIG. 7C. After the single string charging, battery pack A may continue charging. If the pre-charge state of BMU A is not COMPLETE, the pre-charge sequence failed and the driver of the xEV 10 may be notified that BMU A and BMU B are not being charged, as represented by block 244 of FIG. 7B.

At block 258 of FIG. 7C, if the pre-charge state of battery pack B is COMPLETE, battery pack B may continue to charge (block 266). The VCU 16 may check if the difference of the terminal voltages of the battery packs 12 is less than or equal to a pre-determined voltage threshold, as represented by block 268 of FIG. 7C. If not, battery pack B will continue to charge until the difference of the terminal voltages of the battery packs 12 is within the pre-determined voltage threshold. If the difference of the terminal voltages of the battery packs 12 is less than or equal to the pre-determined voltage threshold, the VCU 16 may perform the single string pre-charge sequence 270 illustrated by process diagram 100 in FIG. 5 on battery pack A. The VCU 16 may check if the pre-charge state of BMU A is complete (block 272). If not, battery pack B may continue to charge as represented in block 266 of FIG. 7C, and the sequence may repeat the steps represented in blocks 268, 270, and 272 of FIG. 7C. If the pre-charge state of BMU A is complete, the pre-charge sequence is complete with dual string charging with the battery pack with the lower terminal voltage (battery pack B) charged first, as represented by block 254 of FIG. 7B. After the dual string pre-charge sequence is complete, battery pack A and battery pack B may continue charging.

At several points in the pre-charge sequences of both drive and charge mode, the BMU 14 may determine the pre-charge state of its respective battery pack 12. While FIGS. 5-7 illustrate logic of the VCU 16 operation, the process diagram 300 of FIGS. 8A and 8B illustrates logic of the BMU 14 for the pre-charge diagnostic sequence that determines the pre-charge state. The logic of the process diagram 300 may start in the BMU 14 when the CONNECT DRIVE or CONNECT CHARGE command is sent from the VCU 16 to the BMU 14 over the vehicle bus 18 with the CAN protocol, as represented by block 302 of FIG. 8A. After receiving the command, the BMU 14 may determine if a pre-charge failure has occurred within a time period threshold, such as the past two seconds (block 304). If so, the BMU 14 may inhibit the pre-charge until a given time period, such as two seconds, has passed since the last pre-charge failure (block 306). As represented by block 308 of FIG. 8B, the pre-charge may be inhibited. The output pre-charge state may be set to INHIBITED, and the output pre-charge state may be sent to the VCU 16 over the vehicle bus 18 with the CAN protocol, as represented by block 310 of FIG. 8B. After the pre-charge state is sent to the VCU 16, the pre-charge function may be complete (block 312).

At block 304 of FIG. 8A, if a pre-charge failure has not occurred within the time threshold, the BMU 14 may check if the number of pre-charge attempts in a given time frame exceeds an allowable limit, as represented by block 314 of FIG. 8A. For example, the BMU 14 may check if there have been three or more pre-charge attempts in the last two seconds. If so, the BMU 14 may inhibit pre-charge for a time period, such as three minutes (block 316). The output pre-charge state may be set to INHIBITED (block 308), and the output pre-charge state may be sent to the VCU 16 over the vehicle bus 18 with the CAN protocol, as represented by block 310 of FIG. 8B. After the pre-charge state is sent to the VCU 16, the pre-charge function may be complete, as represented by block 312 of FIG. 8B.

At block 314 of FIG. 8A, if the number of pre-charge attempts in a given time frame does not exceed the allowable limit, the BMU 14 may check if it has inhibited the pre-charge function, as represented by block 318. If so, the output pre-charge state may be set to INHIBITED (block 308), and the output pre-charge state may be sent to the VCU 16 over the vehicle bus 18 with the CAN protocol, as represented by block 310. After the pre-charge state is sent to the VCU 16, the pre-charge function may be complete, as represented by block 312 of FIG. 8B.

At block 318 of FIG. 8A, if the pre-charge function has not been inhibited, the BMU 14 may send a command to the pre-charge contactors 84 as well as the negative main contactors 82 to close and begin pre-charging the bus capacitance of the xEV 10, as represented by block 320 of FIG. 8A. The BMU 14 may check if the voltage of the bus capacitance is within a percentage range of the battery pack 12 voltage, as represented by block 322 of FIG. 8A. For example, the BMU 14 may check if the voltage of the bus capacitance is within an upper threshold and a lower threshold, such as within 95% and 105% of the battery pack 12 voltage. If so, the pre-charge may be complete (block 324), the output pre-charge state may be set to COMPLETE, and the output pre-charge state may be sent to the VCU 16 over the vehicle bus 18 with the CAN protocol (block 310). After the pre-charge state is sent to the VCU 16, the pre-charge function may be complete, as represented by block 312 of FIG. 8B.

At block 322 of FIG. 8A, if the voltage of the bus capacitance is not within a percentage range of the battery pack 12 voltage, the BMU 14 may check if the initial voltage of the bus capacitance is greater than a given value, such as 50 volts, for a time period equal to the time constant of the RC circuit formed by the pre-charge resistors 86 and the bus capacitance, as represented by block 326 of FIG. 8A. If so, the BMU 14 may check if the elapsed pre-charge time is greater than or equal to a given pre-charge time threshold, such as 640 milliseconds, as represented by block 328 of FIG. 8B. If the elapsed pre-charge time is less than the given pre-charge time threshold, the BMU 14 may set the pre-charge state to PRECHARGING and output the pre-charge state to the VCU 16 over the vehicle bus 18 with the CAN protocol (block 330). The BMU may then repeat the checks performed in blocks 322 and 326. If the elapsed pre-charge time is greater than or equal to the given pre-charge time threshold, the BMU 14 may set a pre-charge fault as represented by block 332 of FIG. 8B. The BMU 14 may set the pre-charge state to FAILED (block 334) and may output the pre-charge state to the VCU 16 over the vehicle bus 18 with the CAN protocol, as represented by block 310 of FIG. 8B. After the pre-charge state is sent to the VCU 16, the pre-charge function may be complete, as represented by block 312 of FIG. 8B.

At block 326 of FIG. 8A, if the initial voltage of the bus capacitance is less than the given value for a time period equal to the time constant of the RC circuit formed by the pre-charge resistors 86 and the bus capacitance, the BMU 14 may check if the elapsed pre-charge time is greater than or equal to a given time threshold, such as 50 milliseconds, as represented by block 336 of FIG. 8A. If so, the BMU 14 may check if the elapsed pre-charge time is greater than or equal to the given pre-charge time threshold, as represented by block 328 of FIG. 8B. If the elapsed pre-charge time is less than the given pre-charge time threshold, the BMU 14 may set the pre-charge state to PRECHARGING and output the pre-charge state to the VCU 16 over the vehicle bus 18 with the CAN protocol (block 330). The BMU may then repeat the checks performed in blocks 322, 326, and 336 of FIG. 8A. If the elapsed pre-charge time is greater than or equal to the given pre-charge time threshold, the BMU 14 may set a pre-charge fault as represented by block 332 of FIG. 8B. The BMU 14 may set the pre-charge state to FAILED (block 334) and may output the pre-charge state to the VCU 16 over the vehicle bus 18 with the CAN protocol, as represented by block 310. After the pre-charge state is sent to the VCU 16, the pre-charge function may be complete, as represented by block 312 of FIG. 8B.

At block 336 of FIG. 8A, if the elapsed pre-charge time is less than the given time threshold, the BMU 14 may check if the voltage of the bus capacitance is changing at an acceptable rate, as represented by block 338 of FIG. 8B. If the voltage of the bus capacitance is not changing or changing slowly, the bus capacitance may have a short circuit. The BMU 14 may determine if the bus capacitance is changing too slowly by checking the following inequality for consecutive measurements:

$$\frac{(\text{Current bus capacitance voltage} - \text{Initial bus capacitance voltage}) * 1000 \text{ ms/sec}}{(\text{Elapsed pre-charge time} - \text{measurement delay time})} \geq$$

rate of change bus voltage.

If the inequality is satisfied, the BMU 14 may check if the elapsed pre-charge time is greater than or equal to the given pre-charge time threshold, as represented by block 328 of FIG. 8B. If the given pre-charge time threshold has not been reached, the BMU 14 may set the pre-charge state to PRECHARGING and output the pre-charge state to the VCU 16 over the vehicle bus 18 with the CAN protocol (block 330). The BMU may then repeat the checks performed in blocks 322, 326, and 336, of FIG. 8A and block 338 of FIG. 8B. If the elapsed pre-charge time is greater than or equal to the given pre-charge time threshold, the BMU 14 may set a pre-charge fault as represented by block 332 of FIG. 8B. The BMU 14 may set the pre-charge state to FAILED (block 334) and may output the pre-charge state to the VCU 16 over the vehicle bus 18 with the CAN protocol, as represented by block 310 of FIG. 8B. After the pre-charge state is sent to the VCU 16, the pre-charge function may be complete, as represented by block 312 of FIG. 8B.

If the inequality is not satisfied, the BMU 14 may set a short circuit fault (block 340), a pre-charge fault (block 332), and the pre-charge state to FAILED (block 334). The BMU 14 may output the pre-charge state to the VCU 16 over the vehicle bus 18 with the CAN protocol, as represented by block 310 of FIG. 8B. After the pre-charge state is sent to the VCU 16, the pre-charge function may be complete, as represented by block 312 of FIG. 8B.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle control system comprising:
   a vehicle control unit; and
   a plurality of battery packs disposed in parallel and configured to power a bus capacitance of a vehicle deriving at least a portion of its motive power from the plurality of battery packs, wherein each battery pack comprises:
   a pre-charge circuit coupled to the battery pack and configured to limit a current flowing from the battery pack;
   main contactors configured to electrically couple and decouple the battery pack with the bus capacitance upon receiving a first electric signal;
   a pre-charge contactor configured to electrically couple and decouple the battery pack with the pre-charge circuit upon receiving a second electric signal; and
   a battery management unit configured to send data about the battery pack to a vehicle control unit, receive commands from the vehicle control unit, and send signals to the main contactors and the pre-charge contactor based on the commands from the vehicle control unit;
   wherein the vehicle control unit is configured to receive battery pack data from the battery management units of the plurality of battery packs and send commands to a selection of battery management units selected from the plurality of battery packs to pre-charge the bus capacitance with a selection of the plurality of battery packs corresponding to the selection of battery management units based on the battery pack data received from the battery management units.

2. The vehicle control system of claim 1, wherein the battery management unit of each battery pack operates independently of every other battery management unit of other battery packs.

3. The vehicle control system of claim 1, wherein the vehicle control unit is configured to pre-charge the bus capacitance with the plurality of battery packs in parallel if a difference in terminal voltages of the battery packs is less than or equal to a voltage threshold.

4. The vehicle control system of claim 3, wherein the vehicle control unit is configured to pre-charge with a subset of non-failing battery packs if pre-charging the bus capacitance with the plurality of battery packs in parallel fails for one or more of the plurality of battery packs.

5. The vehicle control system of claim 1, wherein the vehicle control unit is configured to pre-charge the bus capacitance with each of the plurality of battery packs sequentially if a difference in terminal voltages of the battery packs is greater than a voltage threshold.

6. The vehicle control system of claim 5, wherein the vehicle control unit is configured to pre-charge the bus capacitance with the battery pack that has a highest terminal voltage before pre-charging the bus capacitance with the battery packs with lower terminal voltages when the vehicle is in a mode enabling discharge of the battery packs.

7. The vehicle control system of claim 6, wherein the vehicle control unit is configured to pre-charge the bus capacitance with the battery packs with lower terminal voltages if the pre-charge sequence fails for the battery pack that has the highest terminal voltage.

8. The vehicle control system of claim 6, wherein the vehicle control unit is configured to indicate to the driver of the vehicle that the battery packs with the lower terminal voltages need to be charged if the pre-charge sequence succeeds for the battery pack that has the highest terminal voltage and the difference in terminal voltages of the battery packs is still greater than a voltage threshold.

9. The vehicle control system of claim 6, wherein the vehicle control unit is configured to pre-charge the bus capacitance with the battery packs with the lower terminal voltages if the pre-charge sequence succeeds for the battery pack that has the highest terminal voltage and the difference in terminal voltages of the battery packs is less than or equal to a voltage threshold.

10. The vehicle control system of claim 5, wherein the vehicle control unit is configured to pre-charge the bus capacitance with the battery pack that has a lowest terminal voltage before pre-charging the bus capacitance with the battery packs with higher terminal voltages when the vehicle is in a charge mode.

11. The vehicle control system of claim 10, wherein the vehicle control unit is configured to pre-charge the bus capacitance with the battery packs with higher terminal voltages if the pre-charge sequence fails for the battery pack that has the lowest terminal voltage.

12. The vehicle control system of claim 10, wherein the vehicle control unit is configured to charge the battery pack with the lowest terminal voltage until the difference in terminal voltages of the plurality of battery packs is less than or equal to a voltage threshold if the pre-charge sequence succeeds for the battery pack with the lowest terminal voltage.

13. The vehicle control system of claim 12, wherein the vehicle control unit is configured to perform a pre-charge routine on the battery packs with the higher terminal voltages when the voltage difference of the plurality of battery packs is less than or equal to a voltage threshold.

14. The vehicle control system of claim 1, wherein the vehicle control unit is configured to charge battery packs that have successfully completed a pre-charge routine.

15. The vehicle control system of claim 1, wherein the plurality of battery packs are configured to supply power to electronic features of the vehicle.

16. The vehicle control system of claim 1, wherein the battery management unit determines the pre-charge sequence is complete if the voltage of the bus capacitance is within a percentage range of the battery pack pre-charging the bus capacitance.

17. A method for pre-charging a bus capacitance of a vehicle that receives at least a portion of its motive power from electricity generated from a battery system using a plurality of battery packs disposed in parallel comprising:
   receiving battery pack data from a battery management unit of each of the battery packs;
   determining, based on the battery pack data, which battery packs may pre-charge the bus capacitance in parallel;
   sending commands to the battery management units to begin pre-charging the bus capacitance by closing a pre-charge contactor in each battery pack to electrically couple the battery pack to a pre-charge circuit configured to limit a current flowing from each battery pack to the bus capacitance;
   receiving status information from each of the battery management units; and
   determining, based on the status information, whether the bus capacitance was successfully pre-charged by the battery packs.

18. The method of claim 17 comprising pre-charging the bus capacitance with the battery packs in parallel if a difference in terminal voltages of the battery packs is less than or equal to a voltage threshold.

19. The method of claim 17 comprising pre-charging the bus capacitance with the battery packs sequentially if a difference in terminal voltages of the battery packs is greater than a voltage threshold.

20. A non-transitory tangible computer-readable medium comprising executable code, the executable code comprising instructions for:
   receiving battery pack data from a battery management unit of each of a plurality of battery packs;
   determining, based on the battery pack data, which of the plurality of battery packs form a subset of battery packs that may pre-charge a bus capacitance in parallel;
   sending commands to the battery management units to begin pre-charging the bus capacitance by closing a pre-charge contactor in each of the subset of battery packs to electrically couple the subset of battery packs to a pre-charge circuit configured to limit a current flowing from each of the subset of battery packs to the bus capacitance;
   receiving status information from each of the battery management units; and
   determining, based on the status information, whether the bus capacitance was successfully pre-charged by the subset of battery packs.

* * * * *